(No Model.)

S. COLE.
CLOD CRUSHER.

No. 281,021. Patented July 10, 1883.

Attest:
L. C. McConnell.
M. D. Phillips.

Inventor:
S. Cole.
By E. B. Whitmon, Atty.

UNITED STATES PATENT OFFICE.

SETH COLE, OF ALTON, NEW YORK.

CLOD-CRUSHER.

SPECIFICATION forming part of Letters Patent No. 281,021, dated July 10, 1883.

Application filed November 27, 1882. (No model.)

*To all whom it may concern:*

Be it known that I, SETH COLE, of Alton, in the county of Wayne and State of New York, have invented a new and useful Improvement in Clod-Crushers, which improvement is fully set forth in the following specification and accompanying drawings.

The object of my invention is to produce a machine to be drawn by horses for reducing clods of earth on plowed ground, the same consisting of a series of batting heads or hammers hung to a common center shaft by means of connecting-arms, and so arranged as to fall as the machine advances and strike in quick succession the ground passed over by the machine, the said series of hammers being arranged to be raised in a body from the ground and loaded or mounted upon carrying-wheels while not operating and during the transportation of the machine from place to place.

Figure 1:
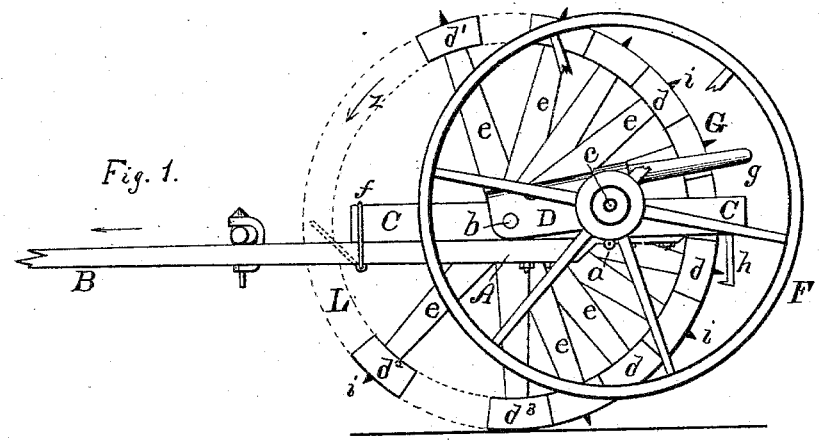
Figure 2:
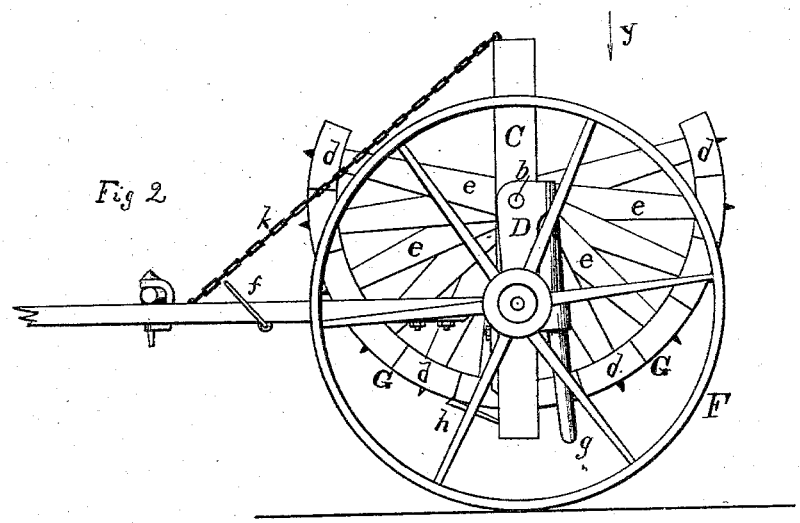
Figure 3:
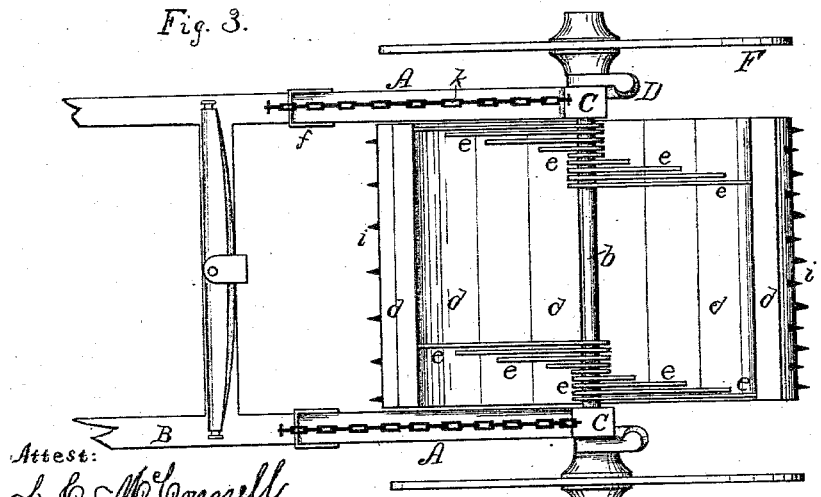

Referring to the drawings, Figure 1 is a side elevation of the machine as it appears when in operation; Fig. 2, a similar side elevation of the same with the hammers mounted between the carrying-wheels or loaded; and Fig. 3, a plan of the same, viewed as indicated by the arrow $y$ in Fig. 2.

Referring to the parts, A A are two parallel horizontal timbers, the forward ends, B B, of which are shaped as thills to attach horses to.

C C are two short timbers resting longitudinally upon the respective thill-timbers A A, and overhanging the latter at their rear ends, as shown, said timbers C C constituting a frame for the machine. At their rear ends the thill-timbers A A are connected to the under surface of the frame-timbers C by hinge-joints $a$ $a$, by means of which joints said frame may be turned or tilted back to a vertical position, as shown in Fig. 2.

$b$ is a horizontal shaft passing through the frame C at right angles with the thill-timbers, and D D are two cranks or connecting-pieces outside of said frame and fastened thereto, into which the respective ends of the shaft $b$ are secured. At their rear ends the connecting-pieces D D are each provided with a horizontal and laterally-projecting stud, $c$, upon which studs respectively are mounted suitable carrying-wheels, F, for the machine, which wheels, however, are suspended and not used while the machine is in operation, but are caused to be lowered to the ground and to carry the machine during transportation from place to place by means described farther on.

$d\ d\ d$ are a series of uniform bars or heads, of wood or metal, each being supported or held to the shaft $b$ by means of arms or supports $e\ e$, of uniform length, said arms being fitted to turn freely on the shaft. These heads are designed to act independently upon the clods and soil during the operation of the machine, and are to be made of a length suitable to operate upon a strip of ground of any desired width as the machine advances. They are all parallel with the center shaft, $b$, equidistant therefrom, move independently of each other around said shaft, and are fitted to lie against each other, like segments or staves of a hollow cylinder, as shown. These heads are sufficient in number and size to fill an arc of more than a semicircle, and form, collectively, something more than a half cylinder or cylindrical shell, G. The machine, in consequence of the action of the heads $d\ d$, moves over the ground similarly as a common roller moves, and is novel in its operation—that is to say, when one of the heads $d$, on account of the forward motion of the machine, arrives at the top of the shell G and becomes overbalanced toward the front, as shown at $d'$, it falls forward, as indicated by the arrow $z$, and on arriving near the bottom, as shown at $d^2$, deals the earth a blow from its momentum, calculated to reduce any clods or lumps of earth that may be in its way. After the blow is given the head arrives at the bottom, or to the position shown at $d^3$, when it takes its place as a part of the cylindrical shell G and temporarily supports the weight of the whole machine as the latter advances, acting in the capacity of the felly of a wheel or the shell of a roller as it rolls along the ground. In the meantime another head has overbalanced and fallen forward like the preceding one, and in turn each head falls, striking the earth like a hammer, reducing the lumps by its blow, and then temporarily supports the whole, as above described, as the machine is drawn along by the horses.

While the machine is operating, the shell G is in rear of the center shaft, $b$, as shown in Fig. 1, with the open or blank circular space L of the shell in front of said shaft. The descending heads, as above described, fall through the circular space L of the shell, and as the machine advances all the heads revolve around the center shaft, b.

It will be understood from the foregoing explanation that as the machine advances the earth over which it passes will be struck blows in rapid succession by the falling heads, while the machine also, and in addition to its capability of hammering, acts upon the ground as a common roller by compressing the soil from its weight.

The heads d are further provided upon their outer surfaces with spikes or projections i, which strike into the ground as the heads fall, and further tend to divide and pulverize the soil. The force of the blow of the head upon the ground is not due alone to the natural fall from its upper position, but, in addition thereto, it is given an impetus or thrust at the start of its fall by the forward motion at the top of the machine, which motion is greater in the direction in which the machine is moving at that point than at any other. From this cause, when the machine is being drawn along at the ordinary pace of a horse at work, the heads are enabled to do more effectual work upon the lumps of earth encountered in its advance than would result from the mere fall of the heads through the space stated.

When the machine is being drawn from field to field or along the road, and not operating, it is designed to be mounted upon the carrying-wheels F, as above stated. To mount the machine on the said wheels, the hooks h h, pending from the rear of the frame C, are caused to catch between two of the heads d d, as shown in Fig. 2, and the loops or fasteners f f, holding the frame C to the timbers A A, are thrown off, as indicated in dotted position in Fig. 1. Then by backing the machine slightly the frame C is turned or tilted to a vertical position, (shown at Fig. 2,) which carries the shaft b over the studs c c of the carrying-wheels and lifts the shell G clear from the ground, with its blank or open space L uppermost, as shown. Chains k k, attached to the timbers A A and frame C, as shown, prevent the latter swinging back farther than to a vertical position. Handles g g, inserted in suitable sockets in the connecting-pieces D D, assist the operator to unload the machine from the wheels or bring it again in position to operate.

The heads or hammers d d d may be circular, diamond shape, or of other forms in cross-section, as may prove most suitable in practice, and may be iron-bound or otherwise strengthened and prepared to sustain the shock from the blows delivered upon the ground.

The heads d of this clod-crusher may be made of a greater or less length transversely, so as to operate upon a wider or narrower strip of land as it moves over the same, and to be drawn by one, two, or more horses, as may be desired.

I claim as my invention—

1. In a clod-crushing machine, in combination with the frame C and shaft b, supported thereon, the series of independently-acting heads d, attached to the shaft by means of arms or supports e e, substantially as and for the purpose specified.

2. In combination with the frame C and shaft b, the independently-acting heads d, supported from the shaft by arms e e, said heads collectively forming a part of the circular shell or wall of a cylinder, substantially as specified.

3. In a clod-crushing machine, the combination, with the frame C and center shaft, b, of the independently-acting heads d, connected with the said shaft by arms or supports e, said heads collectively forming a part, G, of a close cylindrical shell, with an open or blank circular space, L, in said shell, through which space the heads d fall to strike the ground as they are brought successively to the top of their circuit by the onward motion of the machine, substantially as specified.

4. In clod-crushers, in combination with the frame C and shaft b, supported thereon, the series of independently-acting heads d, attached to the shaft by means of arms or supports e e, said heads being provided with spikes or projections i, substantially as shown, and for the purpose set forth.

5. The combination, in clod-crushers, of the tilting frame C, shaft b, carrying thereon the independently-moving heads d, carrying-wheels F for the frame C, and means to load the frame, with its swinging heads d, upon the wheels F, substantially as and for the purposes set forth.

6. The combination of the socketed connecting-pieces D D, with their handles g, the tilting frame C, thill-timbers A, with the connecting-joints a a, and the fasteners f and connecting-chains k, substantially as shown and described.

SETH COLE.

Witnesses:
E. B. WHITMORE,
M. D. PHILLIPS.